(12) United States Patent
Nielsen et al.

(10) Patent No.: US 10,652,304 B1
(45) Date of Patent: May 12, 2020

(54) INSTANTANEOUS EGRESS MANAGEMENT SERVICE

(71) Applicant: Amazon Technologies, Inc., Reno, NV (US)

(72) Inventors: Olaf Nielsen, Portland, OR (US);
James Ka Sin Au, Richmond (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 240 days.

(21) Appl. No.: 15/807,257

(22) Filed: Nov. 8, 2017

(51) Int. Cl.
*H04L 29/06* (2006.01)
*H04N 21/2662* (2011.01)

(52) U.S. Cl.
CPC ............ *H04L 65/80* (2013.01); *H04L 65/607* (2013.01); *H04N 21/2662* (2013.01)

(58) Field of Classification Search
CPC .... H04L 65/80; H04L 65/607; H04N 21/2662
USPC ......................................................... 709/246
See application file for complete search history.

(56) References Cited

U.S. PATENT DOCUMENTS

| | | | | |
|---|---|---|---|---|
| 2006/0003733 | A1* | 1/2006 | Chun | H04W 28/24 455/403 |
| 2006/0136597 | A1* | 6/2006 | Shabtai | H04L 29/06027 709/231 |
| 2012/0005365 | A1* | 1/2012 | Ma | G06Q 30/0241 709/231 |
| 2013/0128947 | A1* | 5/2013 | Fryer | H04N 21/2402 375/240.01 |
| 2013/0332620 | A1* | 12/2013 | Gahm | H04N 21/23805 709/231 |
| 2014/0355958 | A1* | 12/2014 | Soroushian | H04N 9/80 386/248 |
| 2017/0070551 | A1* | 3/2017 | Phillips | H04N 21/6373 |

* cited by examiner

*Primary Examiner* — Zi Ye
(74) *Attorney, Agent, or Firm* — Hogan Lovells US LLP

(57) ABSTRACT

Quality parameters, such as encoding bitrate, can be determined for the providing of media content based at least in part upon aggregate consumption data. An unknown number of media players can obtain content at a bitrate that depends upon network conditions, and encoders can use variable bitrate encoding, such that egress bandwidth usage can vary widely over time. Aggregate consumption data can be obtained for the various client devices to project the egress costs for a particular period. If the projected resources deviate unacceptably from the target for the period, new quality setting values can be determined, such as new maximum, minimum, target bitrate, or target quality values for the various quality levels. These settings can be automatically applied or suggested to customers, who can then accept any or all of the suggestions, or choose to adjust at least some of the settings based on the suggestions or cost projections.

20 Claims, 10 Drawing Sheets

INSTANTANEOUS EGRESS MANAGEMENT SERVICE

BACKGROUND

Users are increasingly obtaining content in digital format, often downloading or streaming that content from a remote service. The content will often be provided in a first format, such as a high resolution content, that will then be converted into various other formats appropriate for different devices or content streams. Because viewers will often have devices and connections with different capabilities, which can vary over time, different versions of the same content can be made available, which can have different bit rates or other quality parameters. While such an approach provides flexibility in content delivery, the approach provides uncertainty in the resources required. For content providers with hundreds of channels that each have different versions available, the resources needed to deliver the content over different periods of time can vary widely. This can result in either excess cost to the provider or lower quality delivered to the viewers, among other potential deficiencies.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the delivery of media content. In particular, various embodiments provide for the dynamic adjustment of quality parameters, such as encoding bitrate, based at least in part upon aggregate consumption data. Media players can select to obtain content at a bitrate that depends upon factors such as current network conditions, and encoders can use variable bitrate encoding based upon the content of the media file. Further, the number of devices accessing a particular video file or stream may be difficult to predict with sufficient accuracy. Accordingly it can be difficult to predict the total cost to a customer, such as a video service operator or content distributor, of providing a large amount of variety of content using a content delivery service that incurs charges for metrics such as egress bandwidth. Approaches in accordance with various embodiments can obtain consumption data, including the number of devices accessing the content and the quality level of content accessed, to determine aggregate consumption statistics that can be used to project the egress costs for a customer for a particular period. If the projected costs deviate unacceptably from a specified target (e.g., budget, cap, or quality) for the period, new quality setting values can be determined, such as new maximum, minimum, average, capped, or target bitrate or quality values. These settings can be automatically applied to the relevant encoders, or can be suggested to customers who can then accept any or all of the suggestions, or can choose to adjust at least some of the settings based on the suggestions.

Various other such functions can be used as well within the scope of the various embodiments as would be apparent to one of ordinary skill in the art in light of the teachings and suggestions contained herein.

Figure 1:
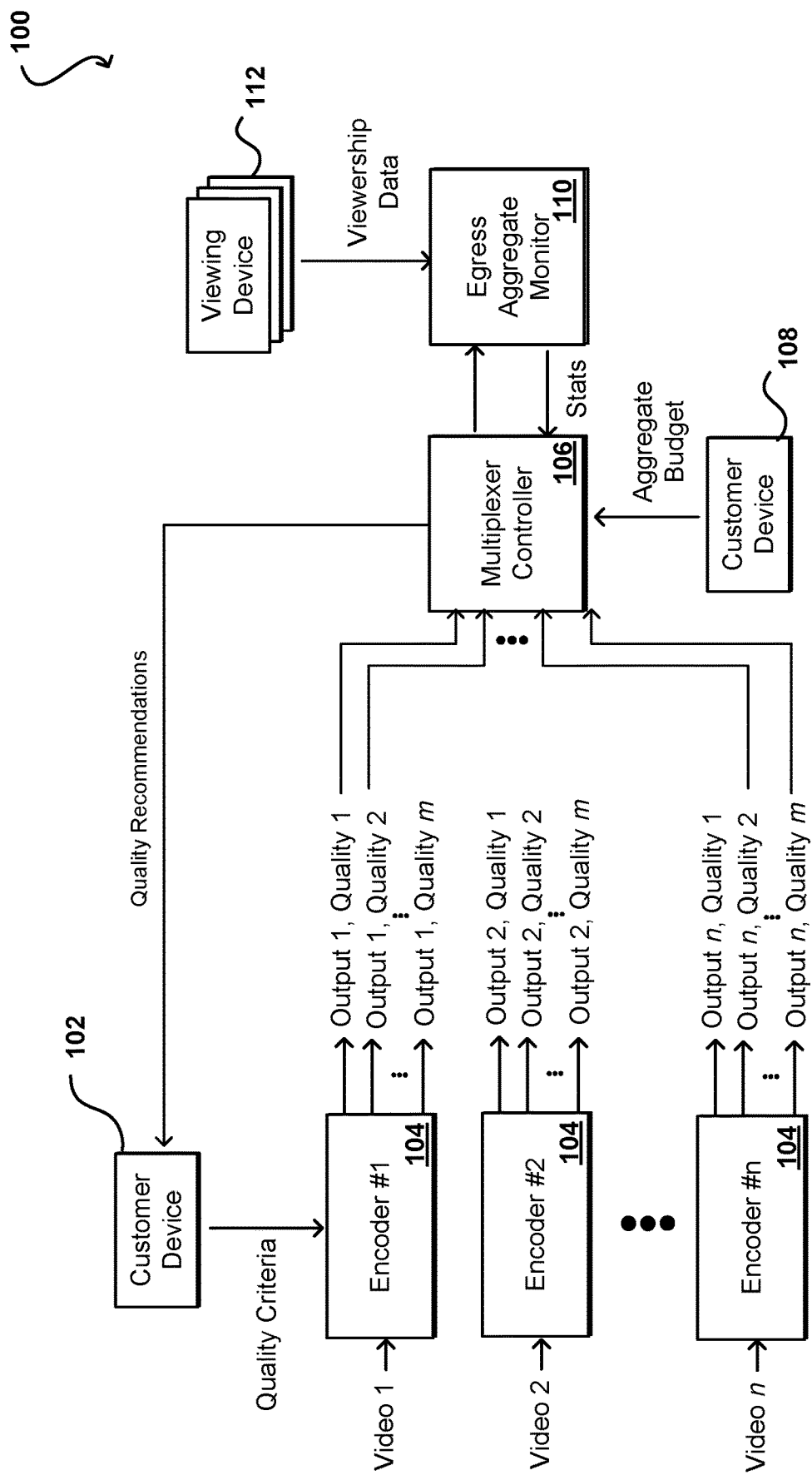
FIG. 1 illustrates an example media delivery system that can be utilized in accordance with various embodiments.

FIG. 1 illustrates an example content delivery system 100 that can be used to deliver content of different quality levels to a variety of viewing devices 112. The viewing devices can be any appropriate devices used to display or present media content, as may relate to notebook computers, tablets, smartphones, set top boxes, smart televisions, heads up displays, wearable computers, and the like. Various video files, streams, and other media content can be obtained that are to be encoded by various encoders 104 to formats capable of being transmitted to the respective viewing devices 112 for display, playback, or other presentation.

In conventional content delivery systems, such as for pay cable service, there may be many different channels, such as hundreds of different channels, for which content was available at all hours of every day. The delivery of this large variety of content was made available largely through statistical time division multiplexing (STDM or StatMUX) technology, in which a communication channel is split into a range of variable bitrate data streams. These often took the form of digital channels delivered to a set of cable boxes or other such devices. The approach provided for a large variety of channels over fixed bandwidth, but generally at the cost of video quality. The content delivered was often lower bit rate, which generally corresponds to a lower video quality, although various codecs or other techniques can be used to attempt to compensate for the lower bitrate. Variable bit rate also generally produces improved video quality with respect to fixed bitrate. The correct bitrate for a media stream is typically a function of the playback device capabilities, network capabilities, and provider cost.

Content today is increasingly being delivered over connections of networks such as the Internet or a cellular network. Accordingly, computing or "cloud" resources are increasingly used to serve and manage the content. Various technologies have been utilized to attempt to limit the cost for "egress" bandwidth, or bandwidth for content that generally is being delivered to third party devices for consumption. One such technology provides for limits or caps on video quality or video bit rate. Such an approach can accept a minimum quality level set by a content provider, for example, and cause the encoders to utilize the minimum number of bits needed to achieve that minimum quality level for any content delivered. Such an approach is not optimal for consumers of the content, as they are getting the lowest quality (meeting the minimum standard) at any given time. Further, the approach is not optimal for the provider as there is still little certainty as to the aggregate cost for providing the content with the varying bit rate.

Accordingly, approaches in accordance with various embodiments provide for more control, flexibility, and predictability in content delivery. In some embodiments, a content provider can set one or more limits or targets for use in delivering content. This can include, for example, a monthly egress bandwidth, such as a budget of $100,000 per month at most, or a maximum egress bitrate threshold, whereby the bitrate might not be able to exceed 500 Mbps, among other such options. There may be various reasons for such limits, such as may relate to a bit rate contract with a network service provider or a limit of a collocated IP switch, among other such factors. The usage can be monitored and new limits suggested as well within the scope of various embodiments.

FIG. 1 illustrates example components that can be used to implement and enforce such limits. These include an egress aggregate monitor (EAM) 110, as well as a multiplexer controller 106, such as a MUX Gen-2 controller. The system can also include various encoders 104, as may be part of a single transcoding system. The encoders 104 in some embodiments can utilize a capped quality algorithm or capped variable bit rate (VBR) algorithm, among other such options. In this example, the EAM 110 can reside at the edge of a content delivery network, such as is discussed in more detail with respect to FIG. 4. The EAM can obtain information regarding a full channel lineup or offering, as well as information about the monthly billing cycle, the cap on the monthly budget, and the algorithm for calculating month-to-date aggregate spend, among other such options.

As an example, a customer might be halfway through a monthly billing cycle on day fifteen, and at the current egress rates the monthly bill is estimated to be $110,000, or 10% over the indicated budget. The EAM 110 can notify the multiplex controller 106 MG2 to reduce the capped video quality setting in order to attain an approximate 10% reduction in average bitrate. The analysis can be performed again, such as the next day, to determine whether the adjustment has put the provider back on track for the budget cap. The performance can be analyzed and settings updated at determined intervals or times, such as on a daily or hourly basis. It will often be the case that the adjustments are relatively small, and in some embodiments limits might be placed on the size of the adjustments. Small adjustments in general should not be perceptible by the average viewer, particularly for daily or monthly changes. A benefit to such an approach is that the system operator does not need to manually monitor performance, as the system is self-adjusting. If the content bandwidth is too high the video quality can be decreased as appropriate, and if the monthly budget is being underspent then the video quality can be increased unless otherwise specified by the relevant provider, etc.

In another example, a content provider might need to ensure that they do not exceed 500 Mbps instantaneous bandwidth on the egress. Accordingly, the various channels can be set to a capped VBR. Some of these channels might be set to a max of 5 Mbps while other channels are set to max of 8 Mbps. The average output bitrate might be 200 Mbps, where each of 100 channels averages 2 Mbps egress, but a simultaneous maximum peak across all channels might be between 500 Mbps and 800 Mbps. The EAM 110 can maintain aggregate thresholds that can be used to inform the multiplexer controller as to how to manage the corresponding encoders 104. For example, when the egress hits 350 Mbps a level 1 throttle can be triggered. The multiplexer controller 106 can notify the encoders 104 to reduce the maximum VBR from 5 Mbps and 8 Mbps to 4 Mbps and 6 Mbps, respectively. The rise in bit rate might slow, but remain increasing. At 425 Mbps the EAM 110 can notify the multiplexer controller 106 to apply a level 2 throttle. The mux controller 106 can then reconfigure the encoders 104 from 4 Mbps and 6 Mbps maximum VBR to 3 Mbps and 5 Mbps maximum VBR, respectively. As the egress bit rate surge decreases, the EAM can roll back the throttles until normal service is restored. A benefit to such an approach is that only the peaks are clipped, and only as critical thresholds are reached. The majority of the time the content deployment will operate runs at or near maximum allowable quality, but rather than impacting all services with a catastrophic surge at egress, all services can see a graceful automatic reduction and restoral which should not significantly impact the consumer.

Such an approach enables customers of a content delivery system or service to meet their data egress budget and video quality targets, or not fall outside the respective limits, automatically and with maximum possible service to customers. Such an approach can prevent the need to manually monitor and/or adjust the bit rates or other quality parameters for various delivery channels, which can be impractical at best for customers with a large number of channels. A customer can use a customer device 102 to provide the quality criteria, such as the quality caps or targets, and this information can be provided to the relevant encoders 104 and other components of the system, such as the multiplexer controller 106 which can also provide quality adjustment (or setting) recommendations to the customer via the same or a different customer device 102. The customer can also use the same or a different customer device 108 to provide the aggregate egress budget information, as may be directed directly to the multiplexer controller 106 as in this example. The encoders can use a rate control model and a variable bit rate approach to determine the appropriate bit rates to use for specific channels. In the example of FIG. 1, each encoder 104 can receive an input video stream and can output multiple video streams or files with varying quality levels, which can then be delivered through the multiplexer controller 106 to the various viewing devices 112, such as through a content delivery network (CDN). The quality levels can be set according to the model, for example, and the encoders can automatically adjust the bit rate as appropriate, such as may be due to changes in the content of the input video stream.

In this example, the encoders 104 are not told ahead of time which bit rates to utilize, which can result in an unknown aggregate bitrate if not adjusted or managed. In order to monitor and adjust the actual usage, a component such as an egress aggregate monitor 110 (EAM) can receive viewership data from the various viewing devices 112, either directly or through a viewing data collection service or other such entity. The EAM can analyze the viewership data and generate aggregate data or statistics which can be provided to the multiplexer controller 106 in this example. The multiplexer controller can then automatically adjust the various quality levels used by the encoders 104, or can provide recommendations for adjustments to the customer. In some embodiments periods of throttling can be applied automatically, but significant adjustments to the quality levels or criteria can require customer approval. The model can also take into account factors such as day of the week or time of day, as the viewership patterns can vary by time or day, but can be relatively consistent for a particular type of time period. This information can be used to update the model over time, such as by using machine learning or another such approach. The viewership pattern information can be important in at least some embodiments because bit rates do not equate directly to egress costs, which can vary based at least in part upon the viewing pattern. The budget in at least some embodiments can then be set on the aggregate bandwidth instead of the egress costs. The EAM 110 in this example can track the bit rates and viewership for each video program provided to the various viewing devices 112 for purposes of adjusting the quality settings and/or updating the model, among other options discussed and suggested herein.

When consuming content, the various viewer devices 112 can have media players installed that are able to automatically detect network conditions, for example, and select the output option with the appropriate bitrate. As an example, a channel might have four streams available with bitrates of 5 Mbps, 3 Mbps, 1 Mbps, and 500 Kbps. The viewer can determine the current network conditions, such as by sending a ping or other such message, and the select that option that is most suitable for the current network connection. The viewership information to be analyzed can then include information such as the number of bits the encoder VBR is generating for each quality level or option, as each level can have a variable bit rate based on content. The viewership information can also include the number of devices receiving each of the streams of a particular quality level. The data is then aggregated at both channel and quality level, to determine the aggregate bit rate that has been used over a period of time. In some embodiments the level information can be obtained from the encoders, while the channel information can be built into, or received from, a viewership monitor. An aggregation table can be built and updated to indicate the number or percentage of viewers for each channel and quality level, which can then be combined with the bit rate data for each level to determine aggregate bit rate information. The aggregate bit rate information can then be analyzed with respect to the relevant period to project the anticipated bit rate usage, and adjust the values for the various quality levels for the channels accordingly. As mentioned, the balance can attempt to provide the highest quality video while still meeting the budget cap.

In the example system of FIG. 1, the encoders 104 implement a capped quality variable bit rate algorithm. The encoders generate the variable bit rates for the various target quality levels per settings provided by the customer. The encoders 104 can then output video for each respective quality level at the fluctuating bit rate. The encoded data then passes through the multiplexer controller 106, which performs the aggregation and monitoring of the bit rate sent for each level. The controller 106 can also store the bit rate data for subsequent analysis. The EAM 110 will receive the viewership data, determine patterns and statistics, then feed at least some of that information back to the controller 106.

The controller can then call back and recommend a new quality level, such as to the encoders 104 for throttling or to the customer device 102 for longer term adjustments. A customer can accept or modify the recommended changes, as some channels may be higher priority and thus should not have quality decreases while others may allow for such adjustments. In many embodiments the quality level will relate to the bitrate. The differences between the levels may be such that an average human viewer may not be able to easily perceive the difference between adjacent levels.

In addition to separating weekdays from weekend days, there can be other separations that can be treated separately, such as by using different models. For example, there might be popup events where a special model or set of parameters might be applied, such as for a sporting championship game or other special event. Similarly, there might be seasonal models or models for specific holiday periods, among other such options. For various levels, this can impact the maximum bitrate or other thresholds or criteria applied to the various levels and/or channels.

Figure 2:
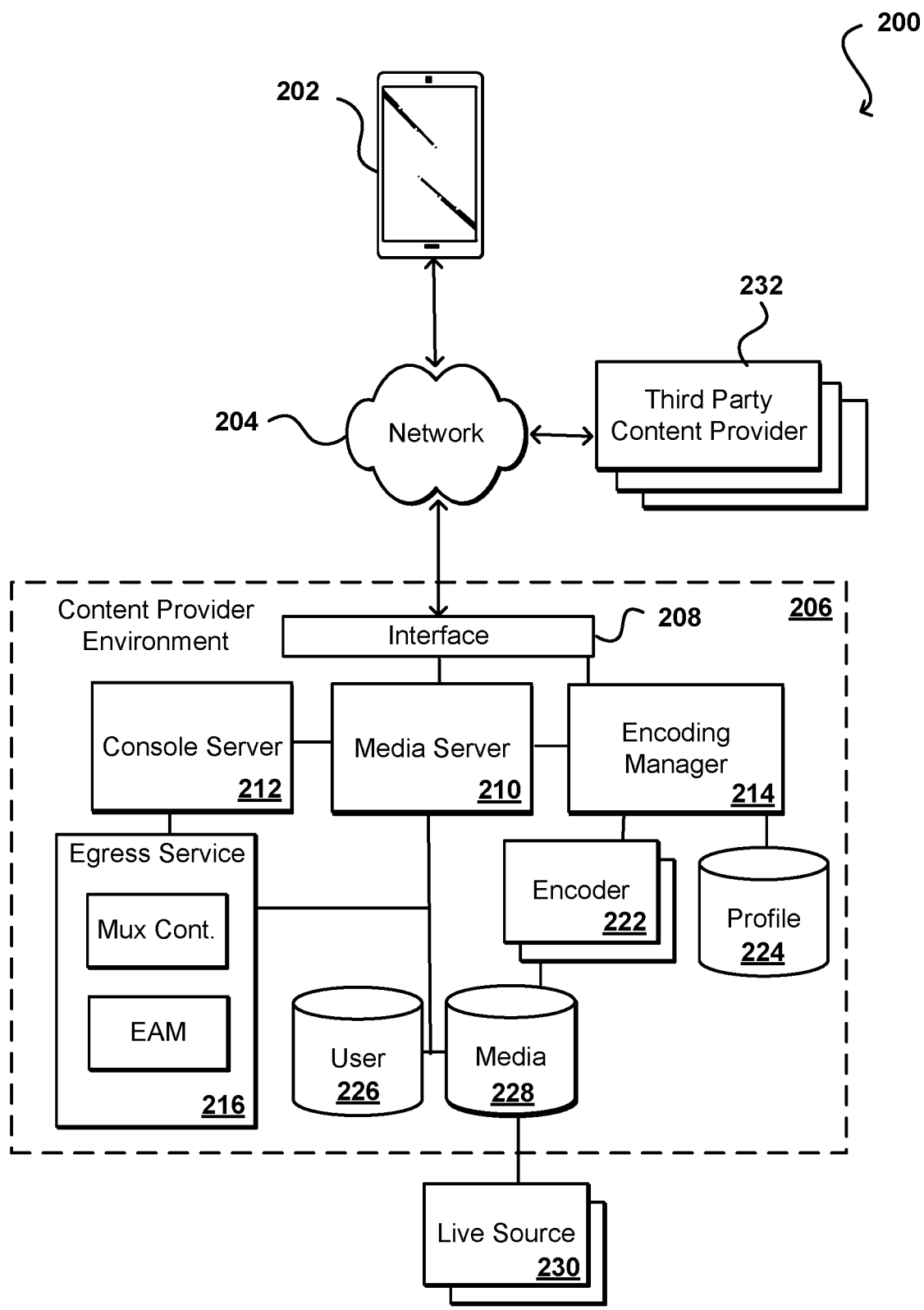
FIG. 2 illustrates an example media management service that can be utilized in accordance with various embodiments.

FIG. 2 illustrates an example content delivery system 200 that can be used to implement aspects of the various embodiments. In this example, a client computing device 202 can submit a request for content across at least one network 204 to be received by a content provider environment 206. This can include a request for specific content or a subscription to have content pushed to the client device 202, among other such options. In at least some embodiments the request can include a request for content to be displayed on, or presented via, the computing device 202, and in many cases will include audio, video, or other media content that is encoded for presentation by the client device 202. The network(s) can include any appropriate network, such as the Internet, a local area network (LAN), a cellular network, an Ethernet, or other such wired and/or wireless network. The content provider environment 206 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, or other such system or device. An interface layer 208, when receiving a request or call, can determine the type of call or request and cause information to be forwarded to the appropriate component or sub-system. For example, a request for content might be forwarded to a media server 210 while a request to specify encoding parameters or generate an encoding profile might be forwarded to a encoding manager 214 or console server 212, among other such options. These calls or requests can also come from third parties, such as streaming content providers who utilize the resources of the content provider environment 206, and third party providers 232 can provide at least some of the media content to be stored to a media repository 228 and/or encoded for display on the client device 202 as discussed herein. Further, a different type of client device 202 can be used to providing encoding information than is used to consume encoded content.

In this example, a call or request received to the content provider environment 206 can be received by an interface layer 208 of the environment. As known for network environments, the interface layer can include components such as interfaces (e.g., APIs), load balancers, request and/or data routers, and the like. If the request is a request for content, such as for a video data stream to be provided to the client device 202, information for the request can be directed to one or more media servers 210, which can obtain the content from a media data store 228 or other such repository or live media source 230 (or data cache temporarily storing media from the live media source) to be sent back across the network(s) 204 to the client device 202, which can be the device submitting the request or a device identified by the request, among other such options. In some embodiments, information for the request might also be compared against user data in a user data store 226 or other such location to determine, for example, whether the user has access rights to that content, and potentially the formats or versions to which the user has access rights.

In at least some embodiments a request from an operator, an administrator, a client device 202, a third party provider 232, or another such source might include a request to specify one or more sets of encoding parameters to be used with a media file. Accordingly, information regarding the encoding parameters can be provided to an encoding manager 214, or other such component or service, that is able to receive the information through an appropriate interface (i.e., an API or console) and cause the profile and parameter data to be stored to at least one appropriate repository 224 as discussed elsewhere herein. When a request for a video file is received, the encoding manager 214 can use the profile and parameter data to determine the appropriate encoding information, and can pass that to one or more encoders 222, such as may include encoding applications running on one or more allocated servers (physical or virtual), which can obtain the media file and encode the media file per the encoding information, which can then be provided to the client device by a media server 210 or other such component.

As mentioned, there are situations where the content to be transmitted to the client device 202 corresponds to a "live" stream. As referred to herein, a live stream refers to a transmission of media content that is received by the content provider environment during a period of capture, such that each frame of media content is received shortly after it is captured, for near real-time representation of an occurrence or event. This media data can be processed (i.e., encoded using appropriate encoding parameters) and then transmitted to the client device with minimal latency, such that the media data can be presented on the client device in near real time (i.e., less than a couple of seconds after the media data was initially captured). Approaches for capturing or displaying live broadcasts and streaming media are well known in the art and as such will not be discussed herein in detail.

For streaming media and other such content transmissions, various video encoding profiles or "presets" can be used that provide for granular control over the encoding parameters for the content to be transmitted. This level of control can require a complex, hierarchical, nested schema, along with an appropriate application programming interface (API) or other such interface, that are compatible with the encoding system. Any incompatibilities can result in a failed or incorrect encoding, which can prevent the media content from accurately being presented by the client device 202. In some conventional encoding systems an encoder appliance can be responsible for presenting, validating, and managing these encoding profiles. Such an architecture can present several challenges, however, such as how to manage these encoding profiles over the life of an encoder appliance that can have frequent changes to the core video encoding engine. For example, an encoding profile created for encoder version 1.0.0 might have a setting called "foo," which might be renamed or replaced for version 2.0.0 with a setting "bar." The version 2.0.0 encoder in this example would then have to maintain an upgrade path for any encoding profile that was created with version 1.0.0. For large numbers of versions and encoding profiles, this can quickly become difficult to manage and can have a high likelihood of error.

Accordingly, approaches in accordance with various embodiments provide a scalable architecture that is able to support current and future version of a media encoding engine. Such architecture can remove the complexity in conventional approaches which rely on the encoder to present and manage multiple encoding profiles. The architecture can provide a profile editor that is independent of any media encoder version, and that provides a normalized interface so that the end user (e.g., customers of the media service or content provider) can create and manage encoding profiles for any released version of the media encoder. In some embodiments, a profile editor can comprise a front-end application that is maintained outside the release cadence of the media editor. This can be a standalone application that customers install or a website accessed through a browser application, among other such options. The core logic for the profile editor can involve consuming a versioned schema, such as a JSON schema, that defines the available encoding settings to be presented to the user. A customer can use the editor to select, define, and/or modify the encoding settings for a profile. Once set, the profile editor can generate an output object, such as a data structure that can be in the form of a JSON object. The output is validated, and if valid can be versioned and written to persistent storage. This versioned output object will be used with the media encoder, in at least some embodiments, to encode corresponding live streaming events or other such content.

As mentioned, a customer can generate multiple profiles and there can be several customers associated with a media service. When combined with the number of encoder versions supported, the number of profiles and settings to manage can be quite large, particularly for enterprise-grade encoders. In conventional approaches, engineers often have to analyze and adjust the various encoding settings for each relevant profile. Encoder updates can be released relatively frequently in order to support new features, provide new settings, support new validations, and provide other such functionality. This can include, for example, supporting a new codec and the associated settings. By providing an architecture that supports such expansion without the need for users to update their software continually, the user experience is improved in addition to the reduction in resources otherwise needed to provide the additional or alternative functionality. Such an approach enables customer to fine tune settings without a need to upgrade, and customers can generate new profiles that are supported by the existing architecture. The architecture can ensure that any impact of the new settings is handled automatically and dynamically with minimal effort on the part of the customer or the provider.

As mentioned, it may be desired in at least some embodiments to adjust the video quality of the media content being encoded. As mentioned, an egress service 216 or other such subsystem can be used that includes components such as a multiplexer controller and egress aggregate monitor to monitor the viewership or access statistics and adjust or recommend changes to the video quality levels used for the encoding. As mentioned, the process can use models based on historical access data for a type of time period, and can ensure that the maximum video quality is provided, in at least some embodiments, while ensuring that the customer or content provider does not exceed the designated aggregate budget cap.

When determining an encoding profile for a media file, the possible values can be determined that are valid for the various primitives. As mentioned, this can include using a JSON schema, Swagger file, XML document, or other such approach to reflect the values. As an example, a customer can select a codec within the video settings. There may be dozens of codecs from which the user can select, and there may be some codecs that are not appropriate for this video stream or channel. The encoding settings module can be used to determine which codecs to provide as options to the customer through the console, as generated using the console server 212. The console service in this embodiment can be programmed to interact with various service endpoints across the content provider environment 206. The console server also is able to locate and serve up the static codebase, which can be pulled from a content delivery network (CDN) or other such location. The console server can obtain the schema modeling documents for generating the encoding profiles, and can generate the necessary information so that the relevant encoder can consume the corresponding profile. Once the customer selects a codec, such as the H.264 codec for high definition digital video, there will be various constraints on the remaining video encoding settings that correspond to the selected codec. An encoding settings module can consume the versioned schema in order to programmatically determine the relevant settings to then surface through the console. The module can also determine appropriate validation instructions for the attributes of the relevant fields. This can include, for example, validating a type of value presented for a field, such as whether the value is a number, string, or Boolean value, among other such options.

Such a system can provide dynamic quality level adjustments for various types of encoded media, such as for live streams or stored media files. The media itself can include audio, video, image, augmented reality, virtual reality, animation, or gaming content, among other such options. The video can be sent in a live stream, according to a broadcast schedule, or on demand, etc.

Figure 3:
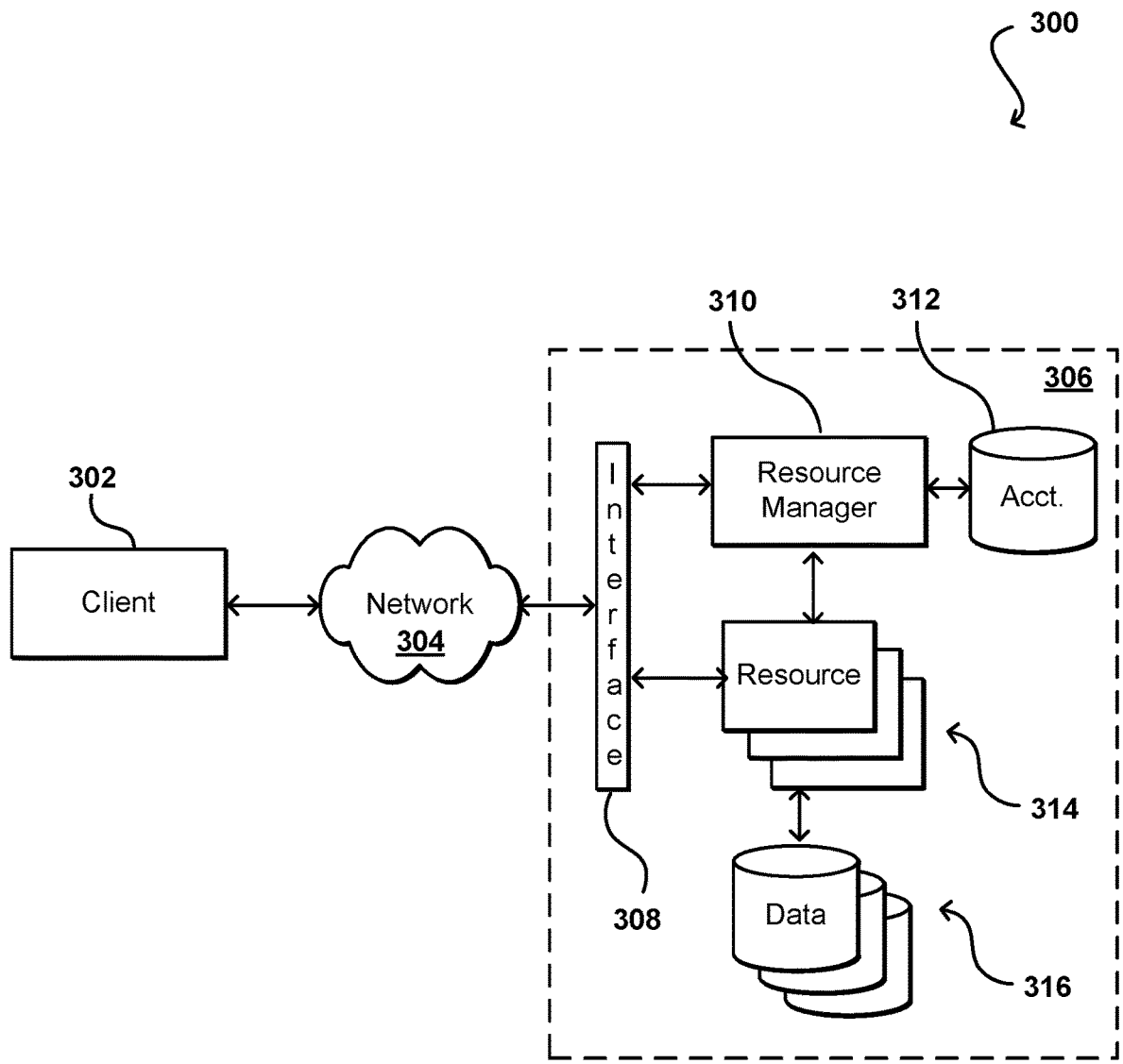
FIG. 3 illustrates an example system that can be used to provide resources for managing media content in accordance with various embodiments.

FIG. 3 illustrates an example environment 300 in which aspects of the various embodiments can be implemented. Such an environment can be used to allocate resources, or resource capacity, for purposes such as to encode or provide media content, among other such options. In this example a user is able to utilize a client device 302 to submit requests across at least one network 304 to a resource provider environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The network 304 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 314 of one or more types. These types can include, for example, application servers operable to process instructions provided by a user or database servers operable to process data stored in one or more data stores 316 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 4:
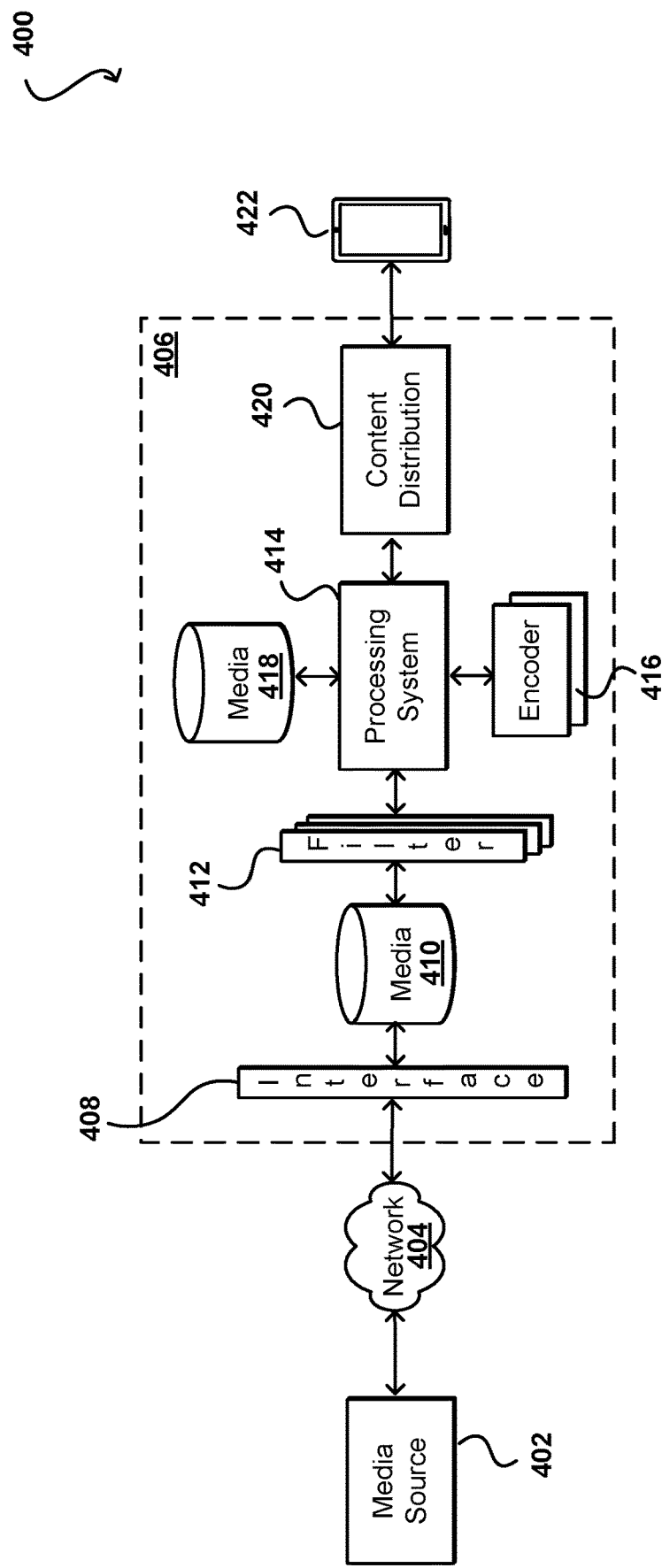
FIG. 4 illustrates an example media encoding system that can be utilized in accordance with various embodiments.

FIG. 4 illustrates an example system 400 that can be used to implement aspects of the various embodiments. In this example, one or more media sources 402 can upload media content over one or more networks 404 to be received to an interface layer 408 of a content provider environment 406. The content provider can be a shared resource environment, as discussed with respect to FIG. 3, or a dedicated network used by the content provider as part of a content service offering, among other such options. For live streaming options the media repository 410 may act as a cache or buffer, while for other options the repository might store the data until sufficient data has been received or an aggregation process in executed, etc.

In this example a processing system 414 can be tasked with analyzing, aggregating, or otherwise generating media content that can be output for display or other presentation on one or more client devices 422. The processing system can include various processing components such as host machines, virtual machines, and the like. The processing system 414, which can also be offered as a service from inside or external to the content provider environment, can obtain the media content from the media repository 410 and cause one or more filters 412 to be applied to the content. As mentioned, the filters can attempt to remove any content that does not satisfy specific criteria, rules, or policies. For example, filters might remove from consideration any files that are not of a specified format, resolution, minimum or maximum length, size range, orientation, or time period. Other filters might be used as well that might not remove the clips from consideration but might be used to rank those clips for potential selection, such as may include sharpness, blurriness, brightness, contrast, view, capture location, or amount of movement for video content, as well as volume, background noise, and dynamic range for audio content. Various other filters can be applied as well as discussed and suggested elsewhere herein. Further, at least some of these filters can be applied on the media sources 402 before upload. These filters can analyze the captured media content and analyze the content before uploading, or can potentially apply the filters before the capture of the content. For example, if a certain format or orientation is required and an attempt is made to capture and upload content with a different format or orientation, then an application on the device might notify the user before capture that the content does not satisfy the relevant criteria, such that the user can make any appropriate adjustments. In some instances the content adjustments might be made automatically, such as to capture in an appropriate format or resize to a specified size, while other adjustment might need to be made manually, such as to capture with a certain device orientation or adjust the amount of ambient lighting, etc.

The processing system 414 can receive or obtain the video content after the filtering and analyze the media content to determine which audio, video, text, or other content to include in the file or stream. The processing system can cause the content to be converted to at least one appropriate media file, for example, using various encoders 416, transcoders, processing algorithms, or other such components, systems, or services. In at least some embodiments, metadata can be written to the output file using the appropriate settings as discussed herein. The produced media can be written to the same media repository 410 or a different media repository 418, which can store the content for subsequent access or buffer the content for live streaming, among other such options.

When the content is to be provided for presentation via a client device 422 or other such system, a content distribution system 420, service, or network can obtain the appropriate data from the repository 418 and cause that content to be provided to the client device 422. In some embodiments, the client device 422 can have the ability to change the feed, stream, or file being received, such as by sending a request to the content distribution system 420 for a new stream, feed, or file. There may also be different versions of the stream, such as may have different sizes, qualities, or formats, from which a viewer can choose. The client device can also potentially upload content related to the media through the interface layer 408 for potential inclusion in subsequent portions, streams, feeds, or files for the content.

Figure 5:
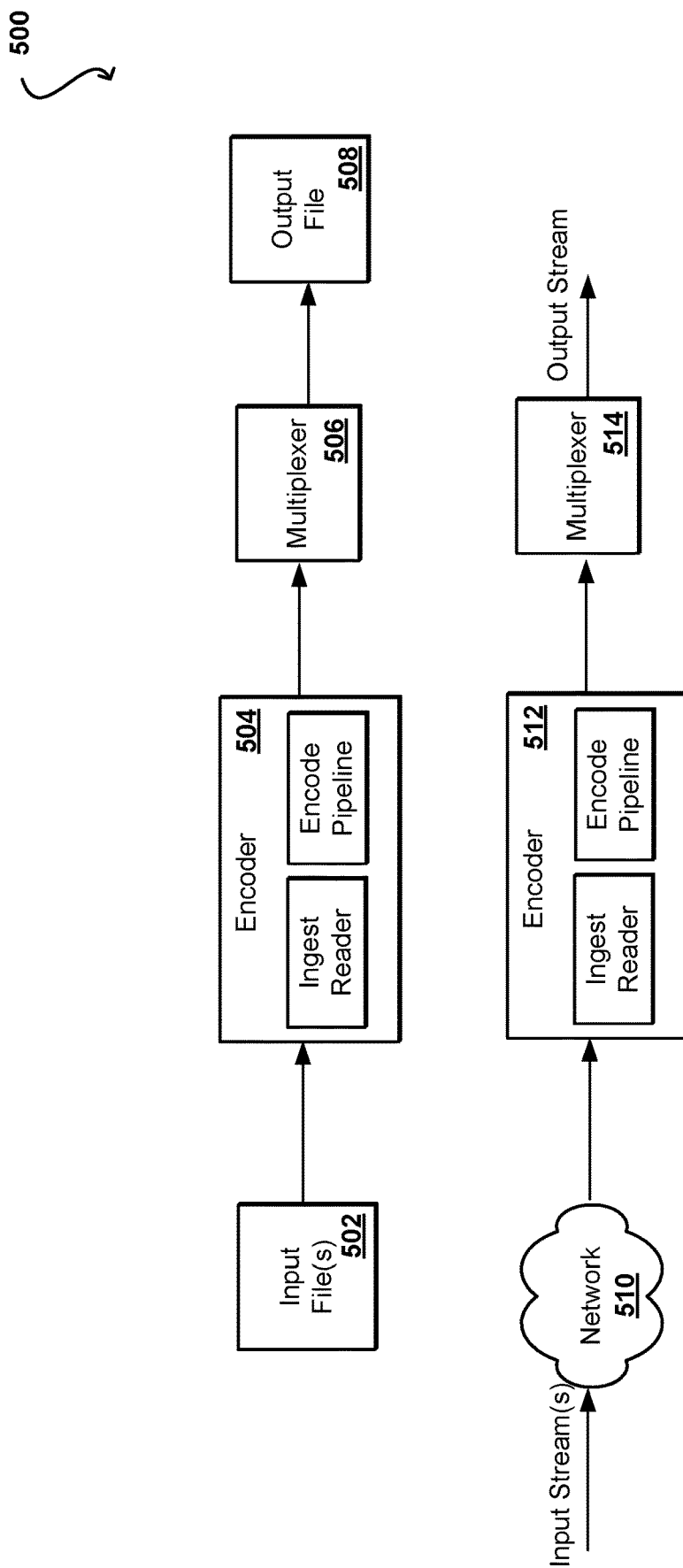
FIG. 5 illustrates components of an example media encoding system that can be utilized in accordance with various embodiments.

In some embodiments the encoding subsystem includes one or more encoders, a set of bitstreams (or video signals), and a content delivery network. Various encoders 504, 512 are illustrated in the example configuration 500 of FIG. 5. The one or more encoders can include both encoders and packagers, which can be implemented via an origin server. A packager can receive a signal (e.g., feed), such as a video signal, a media input file 502, or a live stream over at least one network 510. In this example there is an encoder 504 for the input media files and an encoder 512 for the input streams, with each having a respective multiplexer 506, 514, or sharing a multiplexer, for generating the output file 508 or stream. A live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to a content delivery network (CDN). The bitstreams can represent various encoded/packaged versions of the signal feed, as may be encoded per the encoding parameters from the encoding manager. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams generated in such an embodiment can comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time).

Various media encoders or transcoders can monitor a set of SDI inputs for information such as video format, audio format (i.e., pulse code modulation (PCM) audio format, Dolby Digital audio, Dolby Digital Plus, DolbyE, etc.), audio levels, resolution, frame rate, and timecodes, while being able to concurrently use those inputs to provide media to one or more transcoding pipelines. Other input types, such as asynchronous serial interfaces (ASIs) or high-definition multimedia inputs (HDMIs), can be monitored using such processes as well. As mentioned, the media content obtained by such a system can be provided from any of a number of different sources. For example, content might be obtained from a production company or third party provider.

In some embodiments, a monitoring system can be placed by the egress of the aggregate output of all encoders. It can be a logically separate function from the encoders, and can be located at a separate physical location. The bandwidth threshold notification can be made more robust via use of a heartbeat mechanism between the monitor and the encoders. It might be the case that encoders operate in a default state wherein they observe the mathematical cap and minimum quality. The monitoring system can notify the encoders, or encoding monitor, that the quality can be increased. The service can continue at minimum quality level. If the heartbeat is active, and no acknowledgement is received from the encoders, the monitoring system can resend the notice. If the heartbeat is inactive, the monitoring system can send an alarm for operator intervention. The encoders can remain at a minimum quality setting. If the encoders instead operate in a maximum quality state, not at the default mathematical cap, the monitoring system can notify the encoders (or encoder manager) that the quality must be decreased in at least some embodiments. The service can continue at the maximum quality level. If the heartbeat is active, and no acknowledgement is received from the encoders, the monitoring system can resend the notice. If the heartbeat is inactive, the monitoring system can send an alarm for operator intervention. If the heartbeat is inactive, the encoders can revert to a default state, such as a mathematical cap.

Figure 6:
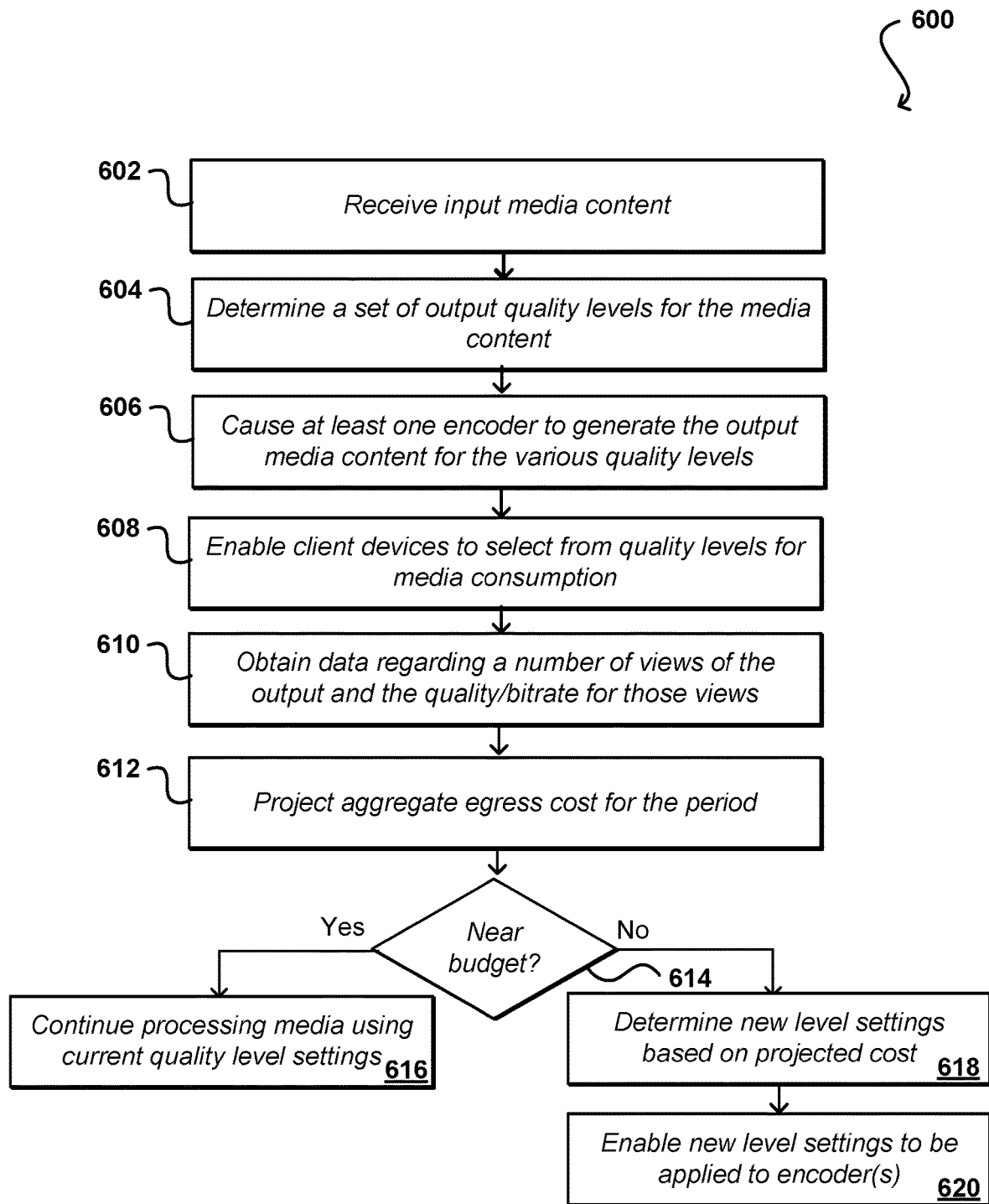
FIG. 6 illustrates an example process for monitoring the cost for delivering media content that can be utilized in accordance with various embodiments.

FIG. 6 illustrates an example process 600 for adjusting quality settings for output media channels that can be utilized in accordance with various embodiments. It should be understood that for any process herein there can be additional, fewer, or alternative steps performed in similar or alternative orders, or in parallel, within the scope of the various embodiments unless otherwise specifically stated. In this example, input media content is received 602 or obtained, such as may relate to an input video stream or stored multimedia file, among other such options. A set of output quality levels can be determined 604 for the media content, as may relate to settings provided by a customer, default level settings for a type of content, etc. There may be various other criteria to be used for the media as well such as specific encoding formats, resolutions, compression settings, and the like. At least one encoder of a transcoding system or service can be caused 606, in this example, to generate the output media content to the various channels using the determined quality level settings. As mentioned, in many embodiments each output video quality level can have a different bitrate, among other such options.

The channels of content can be streamed, broadcast, or otherwise made available for consumption by various client devices or other such components. The content delivery service can enable 608 the client devices to select from the various quality levels for the media content, as may be determined based at least in part upon current network conditions. As known for the consumption of such content, the bitrate selected can vary over time as the network conditions change or as otherwise determined by the media players on the various client devices. Data can then be obtained 610 regarding a number, period, or other indicator of the viewing, presentation, delivery, or consumption of the media content by the various client devices. This can include the number of devices, as well as the bitrate or other information regarding the consumption. The data can be aggregated to determine the average bitrate for each device as well as the total number of devices in at least some embodiments, which can then be used to project 612 an aggregate egress cost for the period. Various other approaches can be used to calculate consumption over a period of time, and the projection can be based at least in part upon the egress cost to this point in the period and the remaining amount of time in the period, extrapolating out the usage linearly or according to an expected usage function or model, among other such approaches discussed and suggested herein. A determination can be made 614 as to whether the projected cost is sufficiently near the relevant budget, such as within an allowable deviation threshold of a provided customer egress budget. It should be understood that in some cases there may be different thresholds for acceptable costs above and below budget, as it may be more important to a customer that the cost goes as little over budget as possible. If the projected cost goes with sufficiently near budget for the period, the processing of the media can continue 616 using the current quality settings. Otherwise, new level settings can be determined 618 that would cause the projected cost to be back near budget. This can include, for example, taking the viewership data for the period and determining new egress values that would enable the cost to be within the acceptable deviation of budget. The new level settings can then be enabled 620 to be applied to the relevant encoder(s) for the media content. This can include, for example, automatic setting adjustment, suggesting adjustments to the relevant customer or entity, or a combination thereof.

Figure 7:
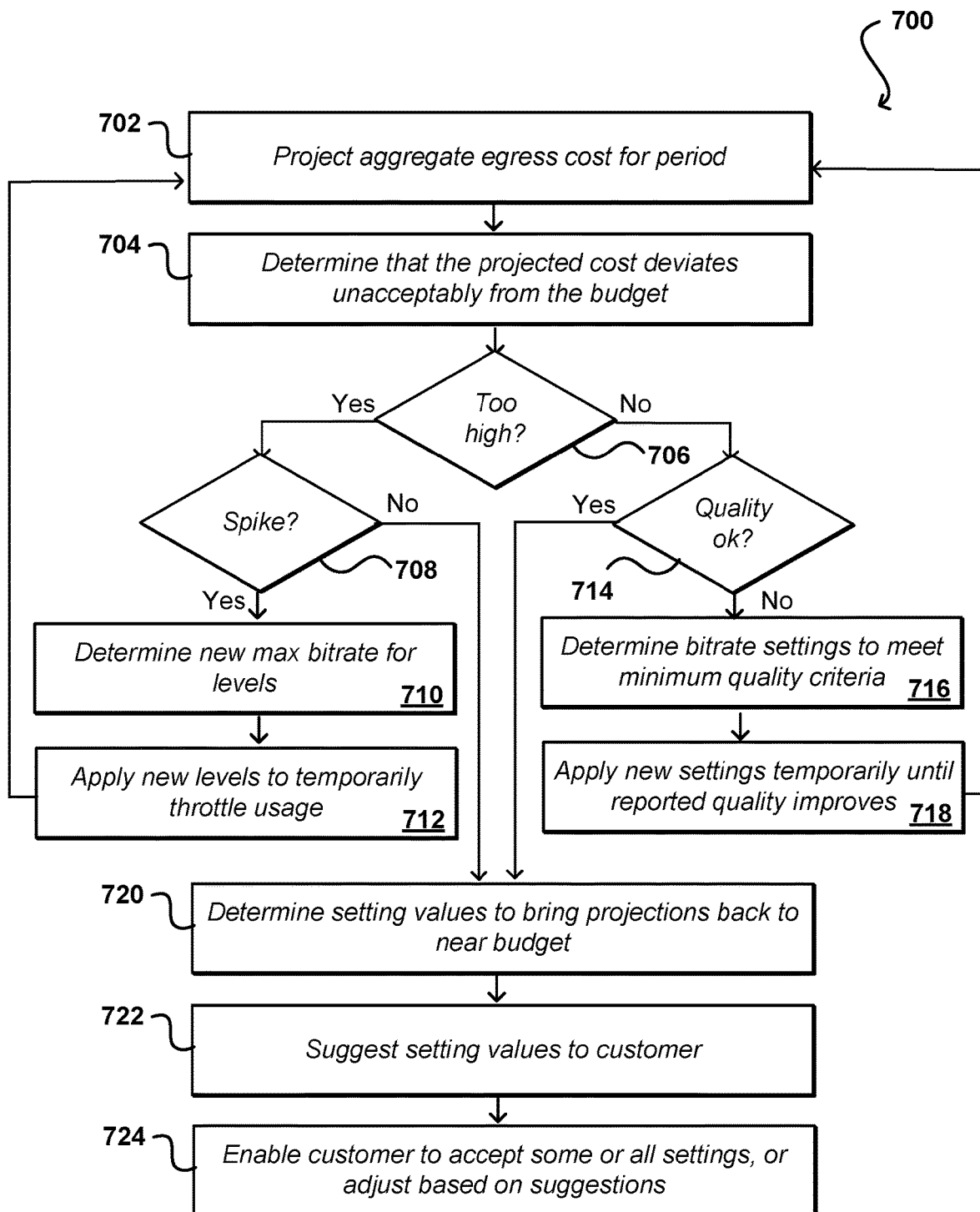
FIG. 7 illustrates an example process for determining new quality settings for encoding media content that can be utilized in accordance with various embodiments.

FIG. 7 illustrates an example process 700 for adjusting level settings that can be utilized in accordance with various embodiments. In this example, the aggregate egress cost for a period can be projected 702, or otherwise calculated or predicted, such as is discussed with respect to the process 600 of FIG. 6. It can subsequently be determined 704, by a multiplexer controller or other such component of a content delivery service in this example, that the projected cost deviates unacceptable from the budget for the period. If the cost did not so deviate, the processing could continue with the current settings as discussed above. The steps to be taken can then be determined based at least in part upon whether it is determined 706 that the projected cost is too high for the current budget or too low for the current budget, although other considerations can be involved as well in other embodiments.

If it is determined that the projected cost is too high, a determination can be made 708 as to whether this is due to a recent spike or increase in consumption, or whether the projection is based on consumption that is relatively stable over time, at least for a type of period (e.g., a weekday or weekend). If the projection is due to a spike, a new maximum bitrate can be determined 710 for the various quality levels for the content, and the new levels can be automatically applied 712 to the encoders in order to temporarily throttle the consumption, wherein consumers will receive slightly lower quality video until such time as the rate or amount of consumption falls back to normal or expected levels. If it was instead determined that the projected cost was too low, a determination can be made 714 as to whether the quality of the delivered video still meets acceptable quality promises or delivery thresholds. If not, a similar process can commence wherein the new bitrate settings (such as minimum bitrate settings) are determined 716 to cause the quality to at least meet the minimum requirements, and the new settings can be automatically applied 718 at least temporarily until the quality of delivery is back to within the quality terms of service.

If the projected cost is outside the budget, but quality is still acceptable and the projection is due to consistent demand, then another approach can be taken that in this example does not involve the automatic, but temporary, adjustment of quality settings. Here, new quality level setting values can be determined 720 that would bring the projected cost back to within an acceptable deviation of the budget for the period. These setting values can then be suggested 722 to the user, along with information such as the projected costs for both the current and new settings for the period. The customer can then be enabled 724 to accept some or all of the settings, or adjust the current settings based in part upon the suggestions. In some embodiments a customer can make proposed adjustments to the settings and receive projected impact costs resulting from those settings. Such an approach can provide value where a customer may not want to lower quality for certain types or channels of content, or may provide a wider range of level values for certain types of content, etc.

Figure 8:
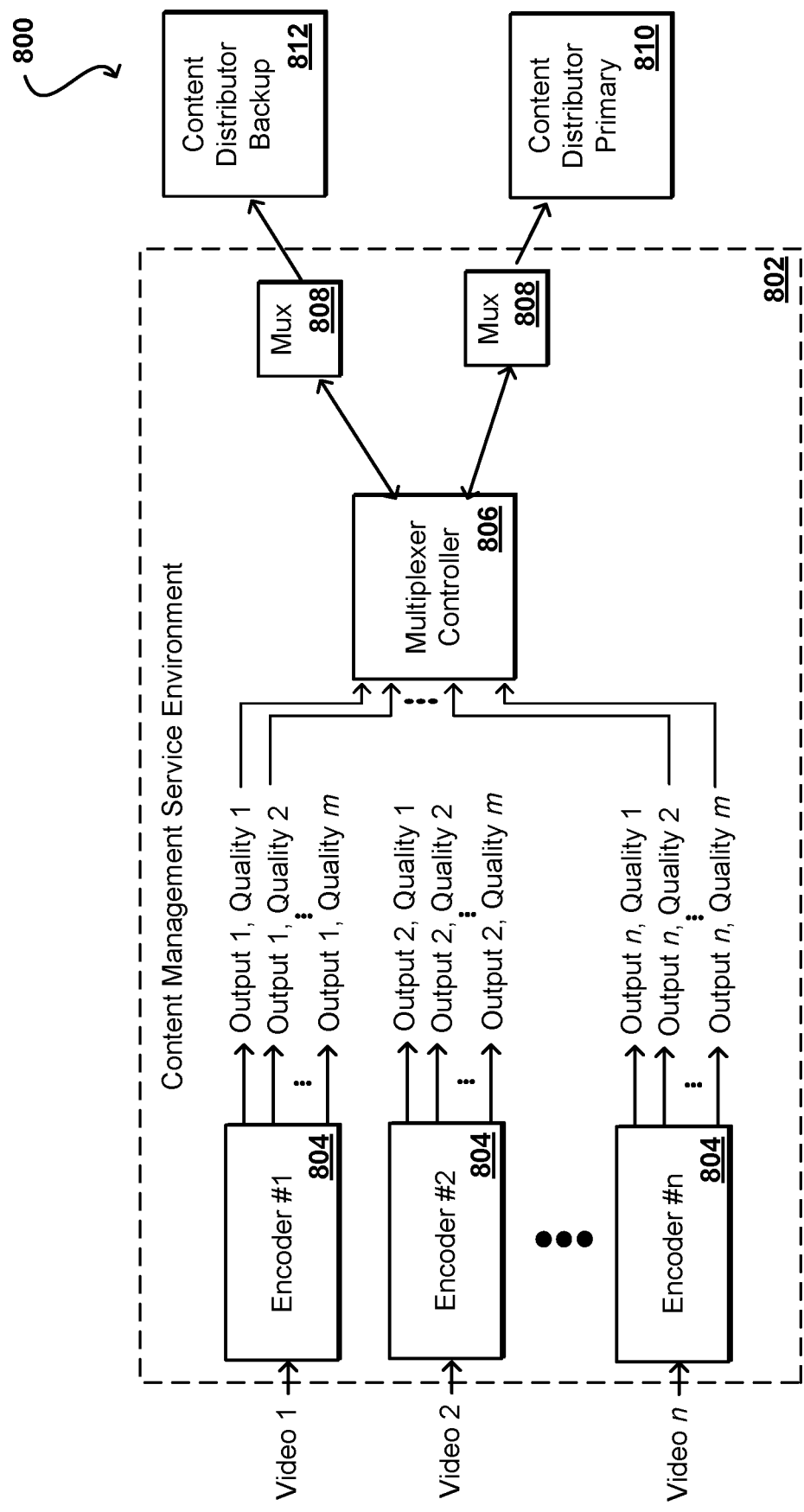
FIG. 8 illustrates components of another example media encoding system that can be utilized in accordance with various embodiments.

As mentioned, budgets, caps, or targets other than maximum bandwidth costs can be applied within the scope of the various embodiments. For example, consider the system implementation 800 illustrated in FIG. 8. In this example, as with the example of FIG. 1, multiple video inputs are received that are encoded using a set of encoders 804. In this example, the encoders 804 are illustrated to be part of a content management service environment 802, such as the provider environment discussed with respect to FIG. 3. In this example, there may be dozens or hundreds of channels available for a customer, in this case a content distributor such as a pay television operator, where each channel can be encoded at different quality levels. In this example, however the content is not provided directly to the end viewers, who can have devices that pull at varying rates, but instead is provided to a single primary content distributor system 810. It might be the case, such as in this example, where a duplicate stream is provided to a backup system 812 for the content distributor, among other such options. While such an approach may not need to manage the selections of various client devices with respect to quality selections, the large number of channels of varying content, when used with variable bit rate encoding, can still provide for large swings in egress bandwidth usage.

For a customer such as a content distributor, the customer might put into place a maximum instantaneous egress bandwidth cap. This can be for a number of reasons, such as to manage cost but also to prevent significant degradation in content quality during periods of heavy usage. For example, a hard bandwidth cap can be implemented to prevent random errors from being introduced in any of the video channels for the distributor. In this example there are multiplexers 808 at the edge of the content management service environment 802. The multiplexers 808 can provide instant feedback about the egress bandwidth being provided to the system. This information can be fed back to the multiplexer controller 806, for example, which can compare the instantaneous egress bandwidth to the respective bandwidth cap. It may be determined that the instantaneous bandwidth is approaching the cap, such as by the bandwidth hitting a threshold value or percentage of the cap. In such a situation, the multiplexer controller can instruct the encoders 804 (or an encoder manager, etc.) to adjust the bitrate used for one or more of the channels or quality levels, in order to attempt to throttle or reduce the usage at least until such time as the instantaneous bandwidth falls back to a more reasonable number that is not near the bandwidth cap.

The monitoring of the instantaneous bandwidth at the network edge provides accurate egress bandwidth data, which can be used to determine a proximity to a relevant bandwidth cap. A customer can utilize various approaches, as discussed elsewhere herein, to prevent excessive bandwidth usage. For example, the customer might have a first set of settings to use under normal conditions, but a second set of settings to use when the instantaneous bandwidth is nearing the bandwidth cap. A first set or version of encoding settings can utilize minimum and average bandwidth settings for a lowest and middle quality level. A highest quality level for the first set is a maximum video quality setting. A second set of encoding settings might use the same low and middle quality level numbers or caps, but utilize a different maximum bitrate value, such as for a maximum per a mathematical guarantee. A multiplexer function at the egress point can make frequent decisions for each channel, potentially down to specific frames or on a frame-by-frame basis, such as may involve an output locking mechanism. Thus, the system in some embodiments can fluctuate back and forth between the two sets dynamically based on the current egress bandwidth. In other embodiments the system will make aggregate determinations that will be applied concurrently to multiple channels, such as non-premium channels, in response to the aggregate egress bandwidth approaching the cap or meeting another such threshold or criterion. By analyzing on a frequent or frame-by-frame basis, it can be virtually guaranteed that the cap will not be exceeded even in the case of severe instantaneous spikes in complexity among many or all of the channels. Other methods can be used as well, which can vary for packaged or non-packaged approaches. For a non-packaged approach, the analysis can be performed in a granularity of one to two seconds, or GOPs, instead of frame-by-frame. The approach could generally be the same, with the encoder telling the multiplexer the appropriate switch points in at least some embodiments.

As mentioned, such an approach can provide a fail-safe mechanism whereby multiple variable bitrate media channels, such as may stream live video, can be delivered over a fixed (or maximum) egress path with a guarantee that there will be no appreciable bandwidth overflow. As mentioned, the bandwidth can be pooled and/or analyzed in aggregate in at least some embodiments. Each channel encoder can output a set of streams for a respective channel, where one stream or output can have a maximum bitrate set for best quality and one stream or output can have a maximum bitrate set to a mathematically determined cap, such as may relate to the aggregate bandwidth for a provider divided by the number of channels. Using such an approach, if the aggregate egress bandwidth is approaching the cap then the guaranteed cap set can be used such that no channel is using more than its portion of the bandwidth. While there may be premium or other channels where higher quality may be desired, if each channel is set to use at most its apportioned share of the bandwidth then it can be guaranteed that there will be no excess bandwidth usage while all the channels are utilizing (at most) that maximum bitrate. The system can maintain and utilize a manifest describing the various output stream segments, which can include information such as the quality levels and locations from which the segments can be retrieved.

As mentioned, a multiplexer can monitor the instantaneous bitrate generated by the channel encoders for each segment. The aggregate bandwidth can be analyzed, and if the sum of the channel output stream bitrates exceeds the bandwidth cap, or maximum aggregated instantaneous egress bandwidth, the multiplexer can update the manifests such that a sufficient number or selection of channels can only utilize up to the guaranteed cap quality level, whereby the aggregate output bandwidth should at most equal the bandwidth cap, and any channel operating at less than the maximum bitrate will cause the aggregate usage to be below the cap. In at least some embodiments the bandwidth aggregation function can utilize a customizable windowing function to tailor the values to the different egress network characteristics. The actual caps for each of these levels can be varied as discussed elsewhere herein, such as where the best video stream quality cap values are updated by the egress monitor, or another such component or system, for optimal aggregate long-term period cost and/or quality. There can also be more than two streams per channel in at least some embodiments, therein the multiplexer can select between the different streams as long as the aggregate bandwidth is less than the cap amount, whereby the selections available may become more limited.

Such monitoring can also allow for the throttling or stepped mitigation of increased bandwidth usage. A stepped mitigation system or throttling mechanism can help to minimize, but not guarantee in at least some embodiments, instances where the bandwidth cap is exceeded. For example, each channel can have streams or outputs of different quality levels as discussed herein. The output for each channel from an encoder can be a variable bit rate output, with settings that might include a minimum, average, and maximum video quality setting. The maximum setting value can provide for the highest quality and highest bitrate for the output media. If all channels are operating at the maximum output, however, the bandwidth cap might be violated, at least for certain periods of time. The system can then set one or more thresholds below the cap such that mitigation begins before the cap is exceeded. While large spikes in instantaneous egress bandwidth will be rare, there may still be situations where such an approach may not prevent excessive bandwidth usage, but can reduce and minimize the excess usage.

In this example, the encoding system can begin to take preventative or remedial action when the bandwidth for a customer begins to approach the bandwidth cap. In this example, the maximum bitrate setting can be temporarily reduced for at least some of the channels, such as channels that are not designated as premium or high quality channels. In some embodiments any or all channels can have their maximum bitrate adjusted. The maximum bitrate of at least the non-premium channels can be reduced using the warning threshold is relieved, such as where the bandwidth is back below the warning threshold. As the usage falls off to normal levels, the bitrate values can be increased or restored. In some embodiments the values can be dynamically adjusted as appropriate in order to provide the maximum video quality for the various channels as long as the aggregate instantaneous bandwidth does not approach, meet, or exceed the specified cap. In some embodiments the bitrate or video quality can be reduced such that the cap is never exceeded, but in some embodiments there will be minimum quality requirements for content delivery that may conflict with this goal. Such an approach can work with packaged or non-packaged outputs delivering various types of content.

Figure 9:
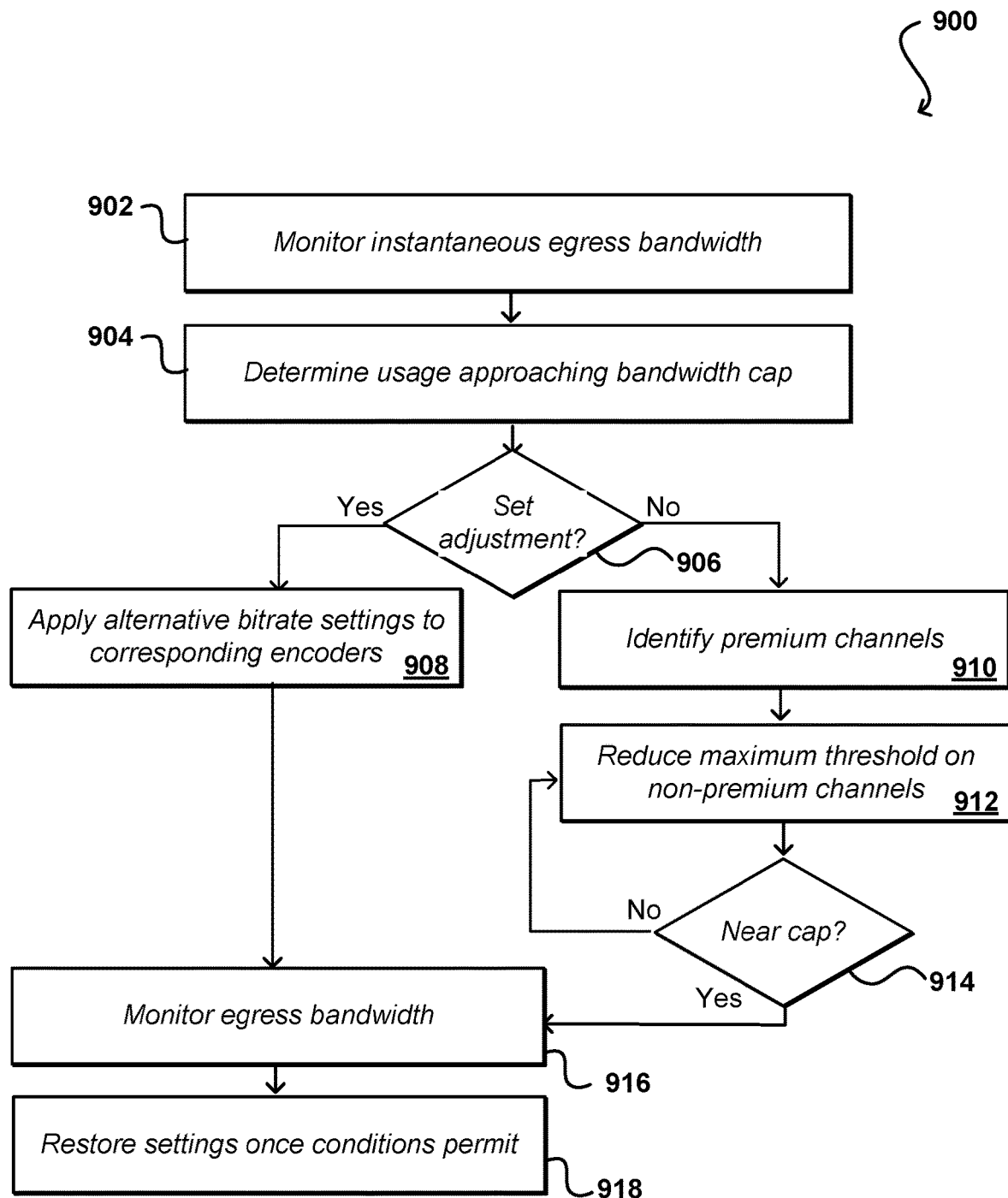
FIG. 9 illustrates an example process for determining adjusting bitrate settings based upon instantaneous egress bandwidth can be utilized in accordance with various embodiments.

FIG. 9 illustrates an example process 900 for adjusting maximum bitrate settings that can be utilized in accordance with various embodiments. In this example, the instantaneous egress bandwidth for a customer can be monitored 902, such as by monitoring egress at the edge for each channel of a content distributor and aggregating the bandwidth used for the various channels. As mentioned, a customer such as a content provider can have a hard bandwidth cap, or set of such caps to use at certain times or for certain situations. The aggregate bandwidth can be compared against the bandwidth cap at an appropriate time or interval, which as mentioned can even occur on a frame-by-frame basis in some situations. Upon comparing the aggregate bandwidth against the cap, it can be determined 904 that the current usage is approaching the bandwidth cap. This can include, for example, the usage hitting a warning threshold or maximum percentage of the bandwidth cap, among other such criteria. As mentioned, there can be at least two specific approaches, which can be used separately or under certain circumstances. For example, there might be two sets of quality settings to be used, one for normal operation and one when the bandwidth is near the cap. This either/or approach can be used by itself or in conjunction with a throttling approach as discussed herein. If it is determined 906 that there is a set adjustment of values for bandwidth near the cap, then the alternative bitrate settings can be applied 908 to the corresponding encoders. For example, there might be 100 channels for a customer with a maximum instantaneous bandwidth cap at 500 Mbps. In order to deliver the highest quality under normal usage, there might be a high quality value setting of 8 Mpbs for the highest quality level. If all channels are using that setting, however, the cap would be exceeded. The system in such an approach can instead shift to settings where the bitrate cap is 5 Mbps per channel, which for 100 channels will guarantee that the channels at most hit, but do not exceed, the bandwidth cap. Long term data can also be used to adjust the values, such as where the maximum values may be able to be adjusted upward due to a number of channels never pulling at the maximum rate, etc.

If there is not a set adjustment, or if current conditions do not warrant such a switch, then a throttling or iterative approach can be utilized in this example. For such an approach, one or more premium channels can be identified 910. As discussed herein, a premium channel can be a channel with a minimum quality level, a higher priority than other channels, or some other designation that prevents or limits the ability to reduce the quality values at a rate the same as those for other non-premium channels. As mentioned, it might be the case that there are no premium channels, or that all channels are to be provided with the highest quality available, among other such options. For at least the non-premium channels, the maximum bitrate threshold can be reduced 912. The reduction can be by a fixed amount, according to a predetermined schedule, or in relation to the amount by which the bandwidth usage is to be reduced. For example, the maximum value might be decreased in steps of 1 Mbps or 500 kbps, might decrease by 10%, or might drop to the next highest maximum value according to a customer schedule, etc. A determination can then be made 914 as to whether the bandwidth is still near, or approaching, the cap. Based at least in part upon the current bandwidth usage and any applicable thresholds or criteria, the maximum threshold can continue to be reduced using the usage is no longer unacceptably near the bandwidth cap. Once the appropriate settings are in place, the instantaneous aggregate egress bandwidth can be monitored 916 to determine when the usage is sufficiently under the cap. Once the conditions permit, the settings (e.g., the maximum bitrate) can be restored, or iteratively increased back to their previous values as long as the bandwidth is sufficiently under the cap.

Figure 10:
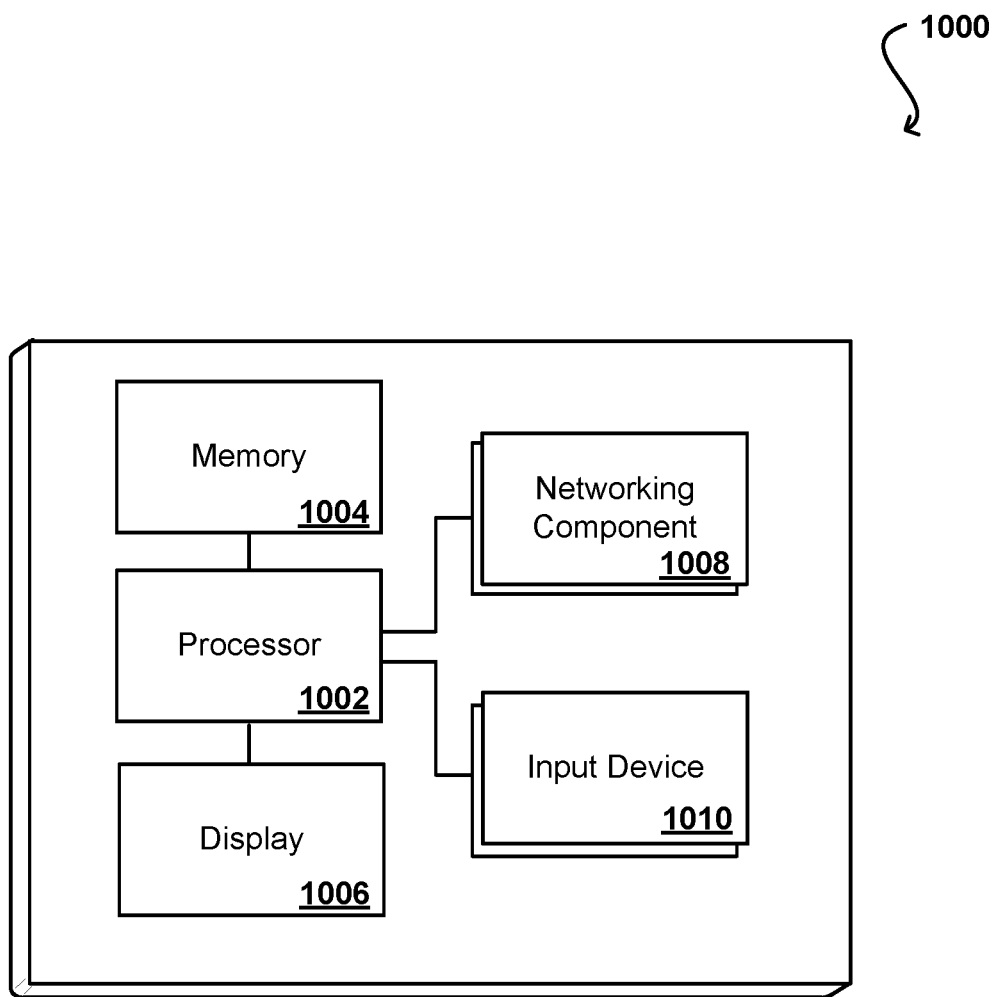
FIG. 10 illustrates example components of a computing device that can be used to implement aspects of various embodiments.

FIG. 10 illustrates a set of basic components of an example computing device 1000 that can be utilized to implement aspects of the various embodiments. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device may include at least one type of display element 1006, such as a touch screen, electronic ink (e-ink), organic light emitting diode (OLED) or liquid crystal display (LCD), although devices such as servers might convey information via other means, such as through a system of lights and data transmissions. The device typically will include one or more networking components 1008, such as a port, network interface card, or wireless transceiver that enables communication over at least one network. The device can include at least one input device 1010 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining input media content to be available in a set of quality levels;
   receiving a set of first quality level values for the input media content;
   encoding, via one or more encoders, the input media content to a set of output media content each having a respective level of the set of quality levels, the bitrate settings for the quality levels determined using a rate control model and the first quality level values;
   providing the set of output media content to a content distribution service, wherein each of the output media content is distributed via a corresponding media channel;
   determining an instantaneous egress bandwidth aggregated across the output media content by analyzing the viewership data collected from a plurality of viewing devices;
   determining that the instantaneous egress bandwidth is within an unacceptable range of a maximum aggregated egress value for the output media content provided to the content distribution service;
   notifying a multiplexer controller of a need to reduce the instantaneous egress bandwidth;
   determining, via the multiplexer controller, a reduced maximum bitrate value for a highest quality level of the set of quality levels;
   determining, via the multiplexer controller, a subset of the output media content based at least in part on a priority level of the media channel of the output media content;
   notifying, via the multiplexer controller, the corresponding encoders of the subset of the output media to apply the reduced maximum bitrate value for the subset of the output media; and
   causing the reduced maximum bitrate value to be applied for at least the subset of the output media content in order to reduce the instantaneous egress bandwidth.

2. The computer-implemented method of claim 1, further comprising:
   causing a set of reduced quality values to be applied to the encoding the input media content, the set of reduced quality values including the reduced maximum bitrate; and
   causing a set of high quality values to be applied to the encoding when the instantaneous egress bandwidth is determined to be below the unacceptable range of the maximum aggregated egress value for the output media content, the set of high quality values including a higher maximum bitrate than the reduced maximum bitrate.

3. The computer-implemented method of claim 1, further comprising:
   determining that encoding using the reduced maximum bitrate still results in the instantaneous egress bandwidth being within the unacceptable range of the maximum aggregated egress value for the output media content; and further reducing the maximum bitrate for the encoding of the input media content to further reduce the instantaneous egress bandwidth.

4. The computer-implemented method of claim 1, wherein the input media content includes content for a plurality of channels, and wherein each channel of the plurality is to have output media content generated according to the set of quality levels.

5. The computer-implemented method of claim 1, further comprising:
enabling the output media content to be encoded using variable bitrate encoding as allowable per the rate control model.

6. A computer-implemented method, comprising:
obtaining input media content;
encoding, via one or more encoders, the input media content to a set of output media content encoded using a set of quality levels having different quality values, the different quality levels including a first maximum bitrate value;
determining instantaneous egress bandwidth for the set of output media content by analyzing viewership data collected from a plurality of viewing devices;
determining that the instantaneous egress bandwidth is above an acceptable bandwidth threshold with respect to an instantaneous egress bandwidth cap for the output media content;
determining a subset of the output media content based at least in part on a priority level of a media channel of the output media content;
notifying a multiplexer controller of a need to reduce the instantaneous egress bandwidth; and
causing a lower maximum bitrate value to be applied to the encoding for at least the subset of the output media content determined by the multiplexer controller while the instantaneous egress bandwidth is above the acceptable bandwidth threshold,
wherein causing a lower maximum bitrate value to be applied to the encoding for at least the subset of the output media content determined by the multiplexer controller includes notifying, via the multiplexer controller, the corresponding encoders of the subset of the output media to apply the reduced maximum bitrate value for the subset of the output media.

7. The computer-implemented method of claim 6, wherein the output media content includes output content for a plurality of channels to be delivered to a content destination, and wherein the instantaneous egress bandwidth is aggregated across the plurality of channels.

8. The computer-implemented method of claim 6, further comprising:
receiving, for the input media content, video content for a plurality of delivery channels; and
encoding, using variable bitrate encoding, the video content for each channel according to the set of quality levels.

9. The computer-implemented method of claim 6, further comprising:
causing the new quality values to be automatically applied to one or more encoders for the input media content for at least a throttling period determined based at least in part upon the instantaneous egress bandwidth.

10. The computer-implemented method of claim 6, further comprising:
determining a high quality set of quality values for the set of quality levels and a reduced quality set of quality values for the set of quality levels, the reduced quality set including a lower maximum bitrate value than a maximum bitrate value of the high quality set.

11. The computer-implemented method of claim 6, further comprising:
determining the lower maximum bitrate value based at least in part upon the number of channels of output media content with respect to the instantaneous egress bandwidth cap.

12. The computer-implemented method of claim 6, further comprising:
determining that instantaneous egress bandwidth is below the acceptable bandwidth threshold with respect to the instantaneous egress bandwidth cap; and
causing the first maximum bitrate value to be reinstated for use in encoding the input media content.

13. The computer-implemented method of claim 6, wherein the quality values for the set of quality levels include at least a minimum bitrate, an average bitrate, and a maximum bitrate to use for the encoding.

14. The computer-implemented method of claim 6, further comprising:
adjusting a rate model used to determine an encoding bitrate for each quality level based at least in part upon a current type of time period.

15. A system, comprising:
at least one processor; and
memory including instructions that, when executed by the system, cause the system to:
obtain input media content;
encode, via one or more encoders, the input media content to a set of output media content encoded using a set of quality levels having different quality values, the different quality levels including a first maximum bitrate value;
determine instantaneous egress bandwidth for the set of output media content by analyzing viewership data collected from a plurality of viewing devices;
determine that the instantaneous egress bandwidth is above an acceptable bandwidth threshold with respect to an instantaneous egress bandwidth cap for the output media content;
determine a subset of the output media content based at least in part on a priority level of a media channel of the output media content;
notify a multiplexer controller of a need to reduce the instantaneous egress bandwidth; and
cause a lower maximum bitrate value to be applied to the encoding for at least the subset of the output media content determined by the multiplexer controller while the instantaneous egress bandwidth is above the acceptable bandwidth threshold,
wherein causing a lower maximum bitrate value to be applied to the encoding for at least the subset of the output media content determined by the multiplexer controller includes notifying, via the multiplexer controller, the corresponding encoders of the subset of the output media to apply the reduced maximum bitrate value for the subset of the output media.

16. The system of claim 15, wherein the instructions when executed further cause the system to:
receive, for the input media content, video content for a plurality of delivery channels; and
encode, using variable bitrate encoding, the video content for each channel according to the set of quality levels.

17. The system of claim 15, wherein the instructions when executed further cause the system to:

cause the new quality values to be automatically applied to one or more encoders for the input media content for at least a throttling period determined based at least in part upon the aggregate consumption data.

18. The system of claim 15, wherein the output media content includes output content for a plurality of channels to be delivered to a content destination, and wherein the instantaneous egress bandwidth is aggregated across the plurality of channels.

19. The system of claim 15, wherein the instructions when executed further cause the system to:
  determine a high quality set of quality values for the set of quality levels and a reduced quality set of quality values for the set of quality levels, the reduced quality set including a lower maximum bitrate value than a maximum bitrate value of the high quality set.

20. The system of claim 15, wherein the instructions when executed further cause the system to:
  determine that instantaneous egress bandwidth is below the acceptable bandwidth threshold with respect to the instantaneous egress bandwidth cap; and
  cause the first maximum bitrate value to be reinstated for use in encoding the input media content.

* * * * *